United States Patent
Ford

(10) Patent No.: US 6,664,923 B1
(45) Date of Patent: Dec. 16, 2003

(54) POSITION AND VELOCITY KALMAN FILTER FOR USE WITH GLOBAL NAVIGATION SATELITE SYSTEM RECEIVERS

(75) Inventor: Thomas John Ford, Calgary (CA)

(73) Assignee: NovAtel, Inc., Calgary (CA)

( * ) Notice: Subject to any disclaimer, the term of this patent is extended or adjusted under 35 U.S.C. 154(b) by 0 days.

(21) Appl. No.: 10/253,161

(22) Filed: Sep. 24, 2002

(51) Int. Cl.[7] ............................. G01S 5/02; H04B 7/185
(52) U.S. Cl. ........................... 342/357.12; 342/357.15
(58) Field of Search ....................... 342/357.12, 357.15; 701/213, 214

(56) References Cited

U.S. PATENT DOCUMENTS 4,894,662 A  *  1/1990  Counselman ............... 342/450
6,407,699 B1 *  6/2002  Yang ..................... 342/357.12
6,424,916 B2 *  7/2002  Nysen ......................... 701/300
6,529,827 B1 *  3/2003  Beason et al. .............. 701/213

* cited by examiner

Primary Examiner—Theodore M. Blum
(74) Attorney, Agent, or Firm—Cesari and McKenna, LLP

(57) ABSTRACT

A GPS receiver utilizes measurements which span previous and current times, such as delta phase measurements, in a modified Kalman filter. The modified Kalman filter updates position information relating to both the current and the previous times, and s propagates the current position and velocity related information. Using both the current and the previous position related information in the filter in conjunction with delta phase measurements, essentially eliminates the effect of system dynamics from the system model, and a position difference can thus be formed that is directly observable by the phase difference measured between the previous and current time epochs.

13 Claims, 2 Drawing Sheets

POSITION AND VELOCITY KALMAN FILTER FOR USE WITH GLOBAL NAVIGATION SATELITE SYSTEM RECEIVERS

FIELD OF THE INVENTION

The invention relates generally to GPS systems and, in particular, to Kalman filters for use in GPS systems.

BACKGROUND OF THE INVENTION

A global positioning system (GPS) receiver requires signals from a number of GPS satellites in order to accurately calculate its position. The GPS receiver acquires and tracks signals consisting of carrier, pseudo random codes and modulated data from various satellites. The receiver correlates locally-generated codes with the codes received from the respective satellites, to derive timing information relating the receiver time relative to the local generation of code chips to the satellite time at the times of the transmission of the corresponding code chips. The timing relationship between the receiver time and the transmission times of the signals at the various satellites can be used in conjunction with the modulated data from the respective satellites to generate a position of the receiver with respect to a reference frame shared with the satellites, for example, the earth centered earth fixed (ECEF) frame.

At least 4 satellites are required to provide a GPS position solution. The GPS receiver determines pseudoranges to the respective satellites and associated Doppler rates, and based on these determines its position relative to the satellites. Corrections to pseudorange measurements with respect to a fixed position, which is generated at a "base station" receiver, can be used to derive a relative position of the local receiver with respect to the base station position. Further, carrier measurements taken at the base station and the local receiver can be mixed in a known manner, to reduce the noise on pseudorange measurements. For example, the carrier measurements associated with a given set of satellites over time may be used to produce carrier-smoothed pseudorange measurements.

The mix of carrier measurements and pseudorange measurements is adversely affected by ionospheric phase advance and multipath. The ionospheric phase advance is equal to and the opposite of the isonospheric group delay, such that over time the change in pseudorange errors deviates from the changes in carrier measurements according to the ionospheric change. Also, pseudorange errors that are corrupted by multipath are biased, such that the combined pseudorange carrier measurement error is difficult to estimate. Further, the carrier measurements from the same set of satellites must be continuously tracked for a sufficiently long time, for example, 100 seconds, to be useful in smoothing, i.e., reducing the noise on, the pseudorange measurements.

It is common for one or more of the GPS satellites to become unavailable to the GPS receiver for various periods of time in, for example, urban environments, when the GPS receiver travels under a bridge, through a tunnel, or through what is referred to in the literature as an "urban canyon," in which buildings block the signals or produce excessively large multipath signals that make the satellite signals detrimental to use for position calculations. When tracking of a particular satellite signal is interrupted, the accuracy of the pseudorange measurements reverts back to the unsmoothed level, since the continuous tracking required for carrier-smoothing has been interrupted.

SUMMARY OF THE INVENTION

The invention is a GPS receiver that utilizes measurements which span previous and current times, such as delta phase measurements, in a modified Kalman filter. The modified Kalman filter updates position information relating to both the current and the previous times, and propagates the current position and velocity related information. Using both the current and the previous position related information in the filter in conjunction with delta phase measurements, essentially eliminates the effect of system dynamics from the system model, as discussed below, and, a position difference can thus be formed that is directly observable by the phase difference measured between the previous and current time epochs.

The filter requires only that the delta phase measurements be available since the previous time epoch, and not that the same set of satellites be available over the time required, i.e., a series of epochs, for carrier-smoothed pseudorange measurements. Accordingly, the filter provides reduced noise positions even in an environment in which various GPS satellites are available, i.e., visible, to the GPS receiver for relatively short periods of time.

More specifically, the delta phase measurements are incorporated in a Kalman filter that has been modified to update both current and previous position error information. The filter maintains current and previous position error states and current velocity error states, and the Kalman propagation is based on the solution of the differential equations describing the dynamics of the state elements. The dynamics matrix of the filter is based on an assumed constant velocity condition and compensates, at least in part, for measurement errors associated with ionospheric and tropospheric conditions by including process noise that is based on a random walk model. The effect of clock bias in the pseudoranges is removed by differencing pseudoranges across satellites. The effect of clock rate is removed from doppler and carrier measurements by differencing these measurements across satellites. With the effects of clock bias and clock rate removed, the position alone becomes observable with differenced pseudorange measurements, and velocity becomes observable with differenced doppler measurements. The single-differenced phase measurements are then differenced across time, to observe the position change between the previous and current position. In this way, the filter essentially removes the adverse effects of system dynamics from the position calculations, and more accurately estimates position and velocity.

BRIEF DESCRIPTION OF THE DRAWINGS

The invention description below refers to the accompanying drawings in which.

DETAILED DESCRIPTION OF AN ILLUSTRATIVE EMBODIMENT

Figure 1:
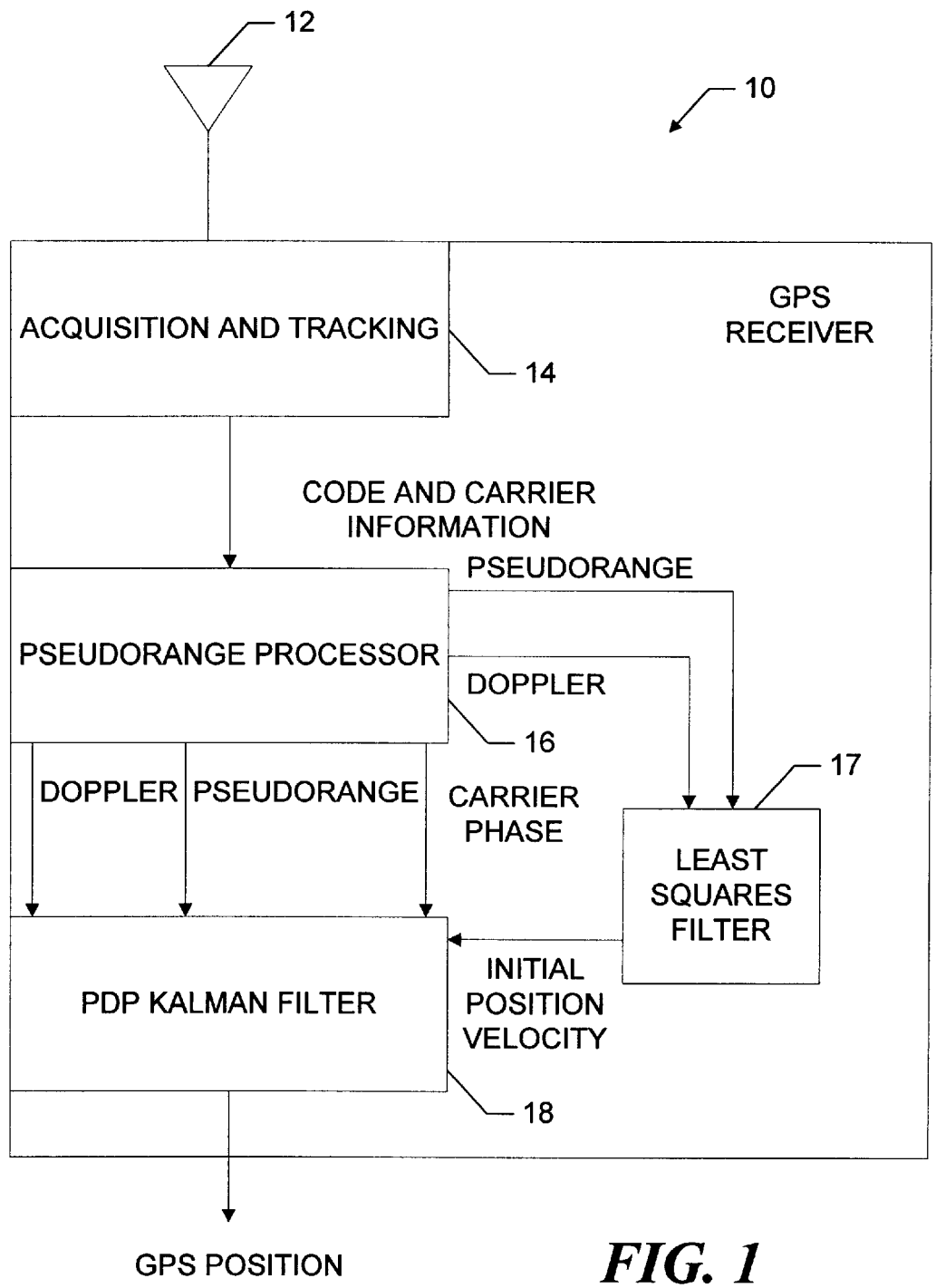
FIG. 1 is a functional block diagram of a GPS receiver constructed in accordance with the invention.

Referring now to FIG. 1, a GPS receiver 10 receives GPS satellite signals over an antenna 12, and processes the signals from at least 4 satellites to calculate GPS position. Acquisition and tracking circuitry 14 operates in a known manner to acquire the satellite signals and track the respective carriers and the pseudorandom codes. A pseudorange processor 16 uses carrier and code timing information to calculate pseudoranges to the respective satellites and the associated Doppler rates, also in a known manner.

The pseudoranges, Doppler rates and carrier phase measurements for the respective satellites are supplied to a PDP Kalman filter 18, which uses the pseudoranges, Doppler rates and delta phase measurements to update system error and covariance information relating to the current position and also a previous position of the receiver, and further to propagate the information relating to current position and velocity error states. The Kalman filter 18 then uses the propagated information to produce a GPS position. The PDP Kalman filter 18 may also be referred to as a "pseudorange/delta phase Kalman filter."

The GPS receiver 10 may also determine its position relative to a fixed-position base receiver (not shown), either through the use of differential correction measurements generated at the base station or after resolving associated carrier cycle ambiguities in a known manner.

A Kalman filter generally updates information relating to current position only. As discussed, the PDP Kalman filter 18 processes information relating to a previous position as well as the current position. Before discussing the PDP Kalman filter 18 in sections 2 and 3, we discuss known Kalman filters in Section 1.

1. Kalman Filters

A Kalman filter, in general terms, estimates of a series of parameters that describe and predict the behavior of a system. The Kalman filter operates with a set of state variables that describe errors in the system and an associated variance covariance matrix that describes the current knowledge level of the state. The Kalman filter maintains an optimal estimate of the system errors and associated covariance over time and in the presence of external measurements through the use of propagation and updating processes.

The Kalman filter propagates a state vector x and a variance covariance matrix P as:

State: $x_t(-)=\Phi x_{t-1}(+)$

Covariance: $P_t(-)=\Phi P_{t-1}(+)\Phi^T+Q$ where, for example, x(+) represents the state vector after update and x(−) represents the state vector after propagation, $\Phi$ is the state transition matrix which is a time solution to a dynamics matrix F, and Q is a process noise matrix that represents the time propagation of the spectral densities of the state elements and compensates for incorrect modeling over time.

To propagate the state and its covariance from some past time to the current time, the Kalman filter propagation step uses knowledge of the state dynamic behavior determined from the physics of the system and the stochastic characteristics of the system over time. The Kalman filter update step is:

$K=P(-)H^T(HP(-)H^T+R)^{-1}$ $x(+)=K(z-Hx(-))$ $P(+)=(I-KH)P(-)$ where z is the measurement or observation vector, R is the observation variance covariance matrix, H is a matrix that represents the linear relationship between the observation and the state vectors, and K is the Kalman gain.

The Kalman filter update step thus uses the linear relationship between the state and observation vectors in conjunction with the covariance matrices related to those vectors to determine corrections to both the state vector and the state covariance matrix.

The PDP Kalman filter 18 determines position and velocity error states using pseudoranges, Doppler rate and delta phase measurements. For ease of understanding, we first discuss the assumptions and manipulations that underlie the updating and propagation steps, in terms of using pseudoranges and Doppler rates to update the current position and velocity error states. We then discuss the PDP Kalman filter operations that update information relating to both the current and a previous position, and also the operations that propagate the current position and velocity information.

2. Using Pseudorange and Doppler Rate Measurements

Assuming that measurements are manipulated to remove receiver clock biases, as discussed in more detail below, the state vector includes 3 states associated with the current position and 3 states associated with the current velocity, namely, $x=[\partial_{Px}, \partial_{Py}, \partial_{Pz}, \partial_{Vx}, \partial_{Vy}, \partial_{Vz}]$ where $\partial$ indicates that the elements are error states, and not system elements. The associated 6×6 state covariance matrix P is initialized from a first determination of the current position and velocity of the receiver. The initial position and velocity information is, for example, supplied by least squares filter 17. The errors associated with the initial position and velocity error states are expected to be relatively large, and the state covariance matrix P initially includes relatively large elements along the diagonal and zeros otherwise.

The propagation of the state vector and the covariance matrix P is based on the solution of the differential equations describing the dynamics of the state elements. An assumption is made that the receiver is operating under constant velocity conditions, and we have modeled the system noise as a random walk. The associated dynamics matrix is:

$$\delta \dot{x} = Fx + w$$

$$F = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

where w is a vector of white noise forcing functions. With the matrix F having constant coefficients, the differential equation solution can be written as $\Phi(\Delta t)=e^{F\Delta t}$. For the F matrix that is utilized in a random walk process $\Phi(\Delta t)=I+F\Delta t$ or:

$$\Phi = \begin{bmatrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

with the solution of the deterministic portion providing a transition matrix, and the solution of the stochastic portion providing a process noise matrix Q. The process noise matrix Q is based on the transition and the spectral densities $Q(\tau)$ of the random forcing functions associated with the state according to the equation:

$$Q_{ECEF} = \int_0^{\Delta t} \Phi(\tau)Q(\tau)\Phi(\tau)^T d\tau$$

where $Q(\tau)$ is a spectral density matrix for the random forcing function vector for the state elements. In general, the spectral densities for the state element forcing functions are not known, and for the PDP Kalman filter 18 the spectral densities will vary with the system dynamics. The spectral densities for the position and velocity will thus be chosen heuristically such that the propagated covariance reflects the actual performance of the system. If the theoretical advantage of a local level spectral density formulation is ignored, the $Q_{ECEF}$ derivation is simple and an analytic expression can be generated because the quantity $Q(\tau)\mathrm{VEL\_ECEF}$ is not position dependent. In this case, the $Q(\tau)_{diag}$ is given by:

$$Q(\tau)_{diag} = (q_p, q_p, q_p, q_v, q_v, q_v)$$

with $q_v$ being the common spectral density for all the velocity elements.

The $Q_{ECEF}$ matrix is then zero except for the following elements:

$$Q_{11} = Q_{22} = Q_{33} = q_p \Delta t + q_v \Delta t^3/3$$

$$Q_{44} = Q_{55} = Q_{66} = q_v \Delta t$$

$$Q_{14} = Q_{41} = Q_{25} = Q_{52} = Q_{36} = Q_{63} = q_v \Delta t^2/2$$

and only the non-zero computed elements are applied to the P matrix elements. The spectral density for the velocity is derived from the cleaned Doppler misclosures, that is, misclosures with outliers removed, where a misclosure is the difference between the actual observations and the theoretical observations that are based on the current satellite set and the last set of position estimates. The filter thus automatically adapts to changes in system dynamics. The spectral densities for position are similarly derived from delta phase misclosures.

The linear relationship between the measurements and the state are derived as a matrix of partial derivatives of the functions that link the measurements and the state elements. If such functions do not exist, then the state is not observable with the measurement set. Once the linear relationship between the state and the measurement set is determined, that is, once the H matrix is determined, the update process follows the update step described earlier.

We discuss the linear relationships associated with the updating of current position and velocity state elements, first for the pseudorange and position, and then for Doppler and the velocity states.

To eliminate the clock components, that is, the receiver clock offset, the pseudorange measurements are differenced across satellites. For the pseudorange difference between satellites i and j and state, a linear relationship can be defined based on the respective positions of the satellites and the receiver. Assuming the single difference is defined as:

$$\Delta \rho^{ij} = \rho^j - \rho^i$$

the linear relationship is $$H = [\Delta x^i/R^i - \Delta x^j/R^j, \Delta y^i/R^i - \Delta y^j/R^j, \Delta z^i/R^i - \Delta z^j/R^j, 0, 0, 0]$$

where, for example, $\Delta x^i = x^i - x_r$, $x^i$ is the x axis component of the position of satellite "i", $x_r$ is the position of the receiver with respect to the ECEF frame, and $R^i = ((\Delta x^i)^2 + (\Delta y^i)^2 + (\Delta z^i)^2)^{1/2}$ represents the best estimate of the geometric range to the satellite from the receiver. The H matrix components associated with the respective satellites are the negative of the direction cosine elements of the unit vector on the line of sight from the receiver to the satellite.

The measurement that is most closely related to the position in the filter is the reduced pseudorange difference, that is, the measured pseudorange difference minus the theoretical pseudorange difference, with the differencing removing the common clock offset. Using pseudorange differences, the observable for the state update equation is:

$$z = \Delta z_m - \Delta z_s$$

where $\Delta z_m$ is the measured pseudorange difference and $\Delta z_s$ is the pseudorange difference reconstructed by the system.

For the reduced Doppler difference measurement from satellites i and j, the linear relationship with the velocity state is:

$$H = [0,0,0, \Delta x^i/R^i - \Delta x^j/R^j, \Delta y^i/R^i - \Delta y^j/R^j, \Delta z^i/R^i - \Delta z^j/R^j]$$

The observable for the state update equation is the difference of two reduced Doppler measurements:

$$z = z_{md}^j - z_{md}^i$$

where $z^{md,i}$ is a single reduced doppler measurement for the satellite i, $$z_{md}^i = d_r - c_i - m_i$$

and $d_r$ is raw Doppler, $c_i$ is the satellite clock rate and $m_i$ is the motion of the satellite in the line of sight direction.

The misclosure, w, for the Doppler is then $$w = z - Hx(-)$$

and, to account for system dynamics, $$q_v = s * \sum_{i=1}^{n} \frac{w_i}{n-1}$$

where n is the number of satellites and s is a scaling factor that is included to account for a geometrical discrepancy that results because the line of sight is generally not in the direction of the velocity vector. In the PDP Kalman filter 18 a scale factor of s=1.5 is used.

When the dynamics of the system do not change, the misclosure w is small and the velocity error is represented largely by the variance after the previous update. If there is a change in the dynamics of the system, however, more process noise is applied because the misclosure w is relatively large.

3. Using Delta Phase Measurements

The PDP Kalman filter 18 uses pseudoranges, the associated Doppler rates and delta phase measurements. The delta phase measurements represent an integrated velocity over time and provide an estimate of the change in receiver position over time in the direction of the satellite generating the phase. To incorporate the delta phase measurements, the PDP Kalman filter includes update and propagation steps that have been modified to include the updating of both the prior and the current positions and the propagation of the current position. Thus, the state vector x for the PDP Kalman filter is defined as:

$$x = [p_1, v, p_0]^T$$

where $p_1 = [x_1 y_1 z_1]$ is the current position error vector, $p_0 = [x_0 y_0 z_0]$ is the previous position error vector and $v = [v_x v_y v_z]$ is the current velocity error vector.

The PDP Kalman filter 18 compensates for the changes to satellite position and atmospheric conditions, and removes the clock biases that are included in the delta phase measurements. The PDP Kalman filter 18 compensates for satellite motion using the available satellite orbit information. Any residual errors caused by differences in the actual satellite motion from the predicted orbit are small when compared to the errors associated with atmospheric changes, and the residual errors are thus ignored. The PDP Kalman filter compensates for the adverse affects in the phase measurements that are associated with atmospheric changes, that is, the changes in the ionosphere and troposphere, by accounting for the changes in part in the error models associated with the measurements and in part in the process noise that is applied to the position information during propagation, that is, in the $q_p$ elements of the matrix Q.

The PDP Kalman filter removes the receiver clock biases from the delta phase measurements by differencing the delta phase measurements across satellites. The underlying phase measurements are thus double differenced across time and the satellites, to remove both clock rate and receiver clock offset biases. The single difference delta phase, that is, the phase difference across time is:

$$\Delta\phi_{t1t2}{}^j = H^j(x_{t1}-x_{t0}) + \Delta\text{Clock}$$

where H is the vector $H^j=[-\Delta x^j/R^j, -\Delta y^j/R^j, -\Delta z^j/R^j,0,0,0,\Delta x^j/R^j, \Delta y^j/R^j, \Delta z^j/R^j,]$ and $x_{t1}-x_{t0}$ is the vector of position differences between $t_1$ (the current time) and $t_0$ (the previous time) with respect to satellite j. The double difference, that is, the difference of the delta phase across satellites, is:

$$\nabla\phi_{t1t2}{}^{ij} = \nabla H^{ij}(x_{t1}-x_{t0})$$

where $\nabla H^{ij}$ is $$\nabla H^{ij}=[\Delta x^i/R^i-\Delta x^j/R^j, \Delta y^i/R^i-\Delta y^j/R^j, \Delta z^i/R^i-\Delta z^j/R^j,0,0,0,-\Delta x^i/R^i+\Delta x^j/R^j,-\Delta y^i/R^i+\Delta y^j/R^j,-\Delta z^i/R^i+z^j/R^j]$$

The double difference H matrix requires that both the current position and the position at the last epoch are available, as discussed above, and thus all position state elements are affected by the delta phase measurements.

The pseudorange measurements, in the form of reduced pseudorange differences, are applied to the current position state elements. Accordingly, the linear relationship is $$H=[\Delta x^i/R^i-\Delta x^j/R^j, \Delta y^i/R^i-\Delta y^j/R^j, \Delta z^i/R^i-\Delta z^j/R^j, 0,0,0, 0,0,0]$$

The Doppler measurements are applied to the velocity state elements and the linear relationship is $$H=[0,0,0\Delta x^i/R^i-\Delta x^j/R^j, \Delta y^i/R^i-\Delta y^j/R^j, \Delta z^i/R^i-\Delta z^j/R^j, 0,0,0]$$

The propagation step of the PDP Kalman filter 18 is modified to support the dynamics equations for the random walk model that involves both the prior and the current positions. Further, the PDP Kalman filter is modified to transfer the current position elements, $p_1$, to the prior position spot in the state vector as part of the propagation. Accordingly, the current position after the previous update becomes the previous position after propagation. At the same time, the PDP Kalman filter propagates the current position error according to the estimated velocity error. To do this, the transition matrix becomes:

$$\Phi = \begin{bmatrix} 1 & 0 & 0 & \Delta t & 0 & 0 & 0 & 0 & 0 \\ 0 & 1 & 0 & 0 & \Delta t & 0 & 0 & 0 & 0 \\ 0 & 0 & 1 & 0 & 0 & \Delta t & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \end{bmatrix}$$

In order to show the analytical effect of this approach, consider the example of a reduced three state filter representing motion along a single axis. The three states consist of the previous and current positions on the axis and the velocity along the axis.

Given the initial state $$x=[p_1,v,p_0]^T$$

and associated covariance at time $t_1$ $$P = \begin{bmatrix} \sigma_{p1}^2 & 0 & 0 \\ 0 & \sigma_v^2 & 0 \\ 0 & 0 & \sigma_{p0}^2 \end{bmatrix}$$

The simplified transition matrix with t substituted for $\Delta t$ is:

$$\Phi = \begin{bmatrix} 1 & t & 0 \\ 0 & 1 & 0 \\ 1 & 0 & 0 \end{bmatrix}$$

The state propagation gives $$x(-) = \Phi x(+) = \begin{bmatrix} 1 & t & 0 \\ 0 & 1 & 0 \\ 1 & 0 & 0 \end{bmatrix} \begin{bmatrix} p_1 \\ v \\ p_0 \end{bmatrix} = \begin{bmatrix} p_1+tv \\ v \\ p_1 \end{bmatrix} = \begin{bmatrix} p_2 \\ v \\ p_1 \end{bmatrix}$$

and covariance propagation gives $$P_i(-) = \Phi \begin{bmatrix} \sigma_{p1}^2 & 0 & 0 \\ 0 & \sigma_v^2 & 0 \\ 0 & 0 & \sigma_{p0}^2 \end{bmatrix} \Phi^T + Q = \begin{bmatrix} \sigma_{p1}^2+t^2\sigma_v^2+q_p & t\sigma_v^2 & \sigma_{p1}^2 \\ t\sigma_v^2 & \sigma_v^2+q_v & 0 \\ \sigma_{p1}^2 & 0 & \sigma_{p1}^2+q_p \end{bmatrix}$$

The covariance matrix has highly correlated position elements. The P matrix remains positive definite because of the uncertainty in the velocity state and the process noise added to the diagonal elements.

Assume the phase measurement geometry is such that all the phase information is in the direction of the modeled axis. Then, the H matrix for the phase observation is $$H=[1,0,-1].$$

If a single phase observation with a variance of $\sigma_{100}^2$ is used in the update, $R=\sigma_{100}^2$ and an expression for the gain can be written:

$$K = PH^T[HPH^T + R]^{-1} = \begin{bmatrix} t^2\sigma_v^2 + q_p \\ t\sigma_v^2 \\ q_p \end{bmatrix} \bigg/ (t^2\sigma_v^2 + q_p + \sigma_\varphi^2)$$

The gain matrix for a small phase variance will be close to 1.0 for the current position element, close to 1.0/t for the velocity element, and close to 0.0 for the previous position element. If there is an error in velocity, say $\epsilon_v$, then the error in position will be $\epsilon_p = t\epsilon_v$, and this will be reflected in the phase measurement to the extent of the accuracy of the phase observable and the geometry. In the example we assume that the geometry is excellent, and thus, the position error is almost entirely represented by the phase measurement (assume a phase noise increment of $\eta_\varphi$). Therefore, during the phase update, the position correction (assuming for simplicity that the previous state vector was zero) will be $$x(+) = K[-t\epsilon_v + \eta_\varphi - x(-)] \cong \begin{bmatrix} -t\epsilon_v + \eta_\varphi \\ (-t\epsilon_v + \eta_\varphi)/t \\ 0 \end{bmatrix}$$

The system's current position will be reduced by almost the exact amount ($t\epsilon_v$) by which it was in error, and the velocity will be reduced by $\epsilon_v$, the amount by which it was in error. Accordingly, if the geometry is good and the error on the phase is small, the relative position and velocity errors will be almost eliminated with the phase update.

The current position uncertainty during the update is modified according to:

$$P(+) = [I - KH]P(-)$$

$$(P(+))_{(0,0)} = \sigma_{pl}^2 + t^2\sigma_v^2 + q_p - (t^2\sigma_v^2 + q_p)\frac{t^2\sigma_v^2 + q_p}{t^2\sigma_v^2 + q_p + \sigma_\varphi^2}$$

which for a small phase variance reduces to:

$$P(+)_{(0,0)} = \sigma_{p1}^2$$

eliminating not only the effect of velocity error over time on the current position, but also the effect of system noise on the current position.
Similarly, the effect of reported velocity error is shown to be:

$$(P(+))_{(1,1)} = \sigma_v^2 + q_v - \sigma_v^2 \frac{t^2\sigma_v^2}{t^2\sigma_v^2 + q_v + \sigma_\varphi^2}$$

which, for small phase noise and small velocity system noise relative to the velocity uncertainty, reduces to:

$$P(+)_{(1,1)} = q_v$$

The delta phase measurement can thus be used in the PDP Kalman filter to compensate for the degradation in knowledge of position derived from velocity error or any other time related source, provided that the phase information is relatively accurate and the geometry relating phase change to position change is relatively good.

The PDP Kalman filter updates position and velocity related information for each of the satellites for which phase differences are available over a measurement interval. Unlike the prior phase-smoothing techniques, the PDP Kalman filter thus provides noise-reduced updated position information as long as at least two satellites are available.

Figure 2:
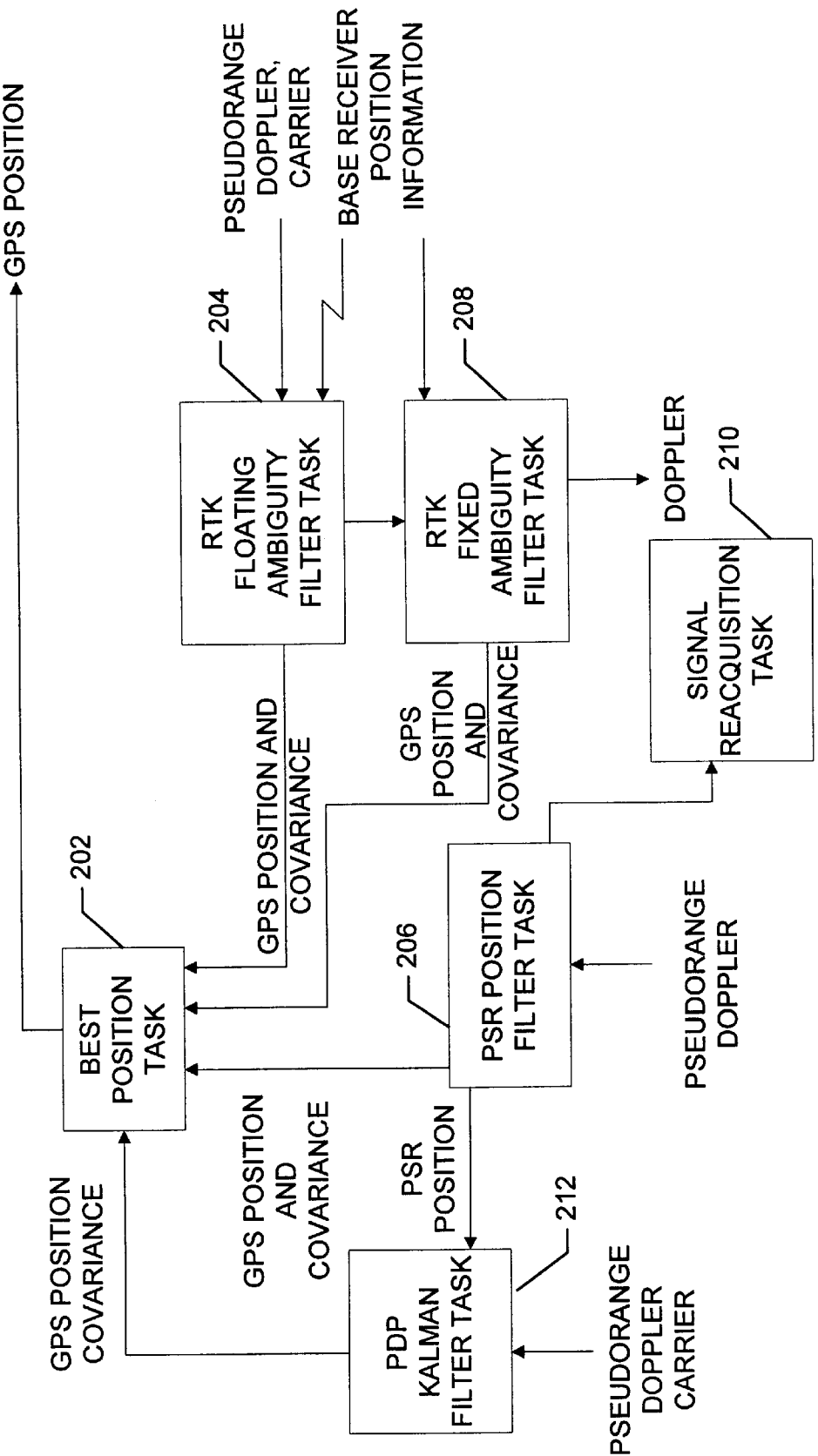
FIG. 2 is a functional block diagram of a NovAtel OEM4 GPS receiver that has been modified to include the Kalman filter of the system of FIG. 1.

Referring now to FIG. 2 we describe the operations of the GPS receiver by way of an example that consists of a NovAtel OEM4 dual frequency GPS receiver that has been modified to include the PDP Kalman filter. The OEM4 can provide L1 and L2 range and carrier measurements, as well as single point, pseudorange differential and carrier-based differential GPS positioning. The GPS receiver thus includes four filters, namely, a PSR position filter 206 which is a pseudorange least squares position estimator that can operate in either single point or differential mode, a pseudorange/carrier RTK floating ambiguity filter 204, a carrier-based RTK fixed ambiguity filter 208, and the PDP Kalman filter, which is denoted in the drawing by the reference numeral 212. An additional filter that provides low latency positions computed from the current local carrier measurements, predicted base station measurements and the best available ambiguities, is also part of the system, but is not material to the operation of the PDP Kalman filter, so is mentioned here only in passing. The respective filters have different error characteristics, and are thus associated with different covariance matrices.

The position and covariance information from each filter are provided to a best-position task 202, which, based on a minimum covariance trace, selects as the GPS position the best of the positions provided by the respective filters. The selected GPS position information is then included in the information that is, for example, provided to a user.

At the epoch boundaries, the best GPS position and associated position velocity covariance information are provided to a signal re-acquisition task 210 and the GPS RTK floating point ambiguity filter 206. The filter 206 uses the information to perform integrity checks or, as appropriate, to aid in ambiguity resolution operations, and the signal re-acquisition task uses the information, as appropriate, to aid in signal re-acquisition tasks.

The signal re-acquisition task 210 requires the instantaneous code and Doppler rate of a given satellite signal as seen by the receiver in order to synchronize a local code generator to the code in the satellite signal. To determine the instantaneous code, the signal re-acquisition task uses the updated GPS position and the velocity or, as appropriate, the velocity covariance information, provided by the best position task, in conjunction with the receiver clock offset and the known satellite position, to generate the theoretical pseudorange to the satellite. The GPS receiver then re-sets the local code generator to an appropriate code chip based on the theoretical pseudorange.

The GPS receiver must also resolve cycle ambiguities in order to determine the GPS position relative to the fixed-position receiver. The GPS receiver first estimates the floating ambiguities associated with the RTK floating ambiguity filter 204. When the position is accurate as represented by the associated covariance, the GPS receiver initializes a search space for the RTK fixed ambiguity filter 208, and the fixed ambiguity resolution process can begin.

As discussed, the PDP Kalman filter essentially removes the adverse affects of system dynamics from position calculation. Further, the PDP Kalman filter produces reduced noise position information as long as delta phase information is available. Thus, the same set of satellites need only be available over one epoch.

The PDP Kalman filter, with its updating of both current and previous position information using delta phase measurements, or an integral of velocity, may be modified to use instead a measurement of the rotation over time of a wheel of, for example, an automobile that carries the GPS receiver. If altitude is one of the system parameters, the PDP Kalman filter may be further modified to use a change in barometric readings over time as an indicator of altitude.

What is claimed is:

1. A GPS receiver including:
   A. an antenna for receiving signals from a plurality of GPS satellites;
   B. an acquisition and tracking processor for acquiring and tracking the satellite signals and making carrier phase and code measurements;
   C. a pseudorange and Doppler rate processor for determining pseudoranges to the respective satellites and associated Doppler rates based on the carrier phase and code measurements;
   D. a pseudorange/delta phase Kalman filter for using pseudoranges, Doppler rates and delta phase measurements to update current and previous position related information and propagate current position and velocity related information and for determining a position of the GPS receiver using the propagated information.

2. The receiver of claim 1 further including
   a second filter for determining an initial position of the receiver, the filter providing the initial position information to the pseudorange/delta phase Kalman filter, and
   the pseudorange/delta phase Kalman filter using the initial position information to initialize a variance covariance matrix that is used for updating and propagation.

3. The receiver of claim 2 wherein the second filter is a least squares filter.

4. The receiver of claim 1 wherein the pseudorange/delta phase Kalman filter uses system models that are based on an assumption of constant velocity.

5. The receiver of claim 4 wherein the system models are further based on a random walk model for system noise.

6. A method of determining GPS position including:
   A. receiving signals from a plurality of GPS satellites;
   B. acquiring and tracking carriers and codes in the satellite signals;
   C. determining pseudoranges and Doppler rates based on the carrier and code measurements;
   D. updating current and previous position related information using the pseudoranges, Doppler rates and delta phase measurements;
   E. propagating the updated current position information and velocity information;
   F. using the propagated position and velocity information to determine GPS position.

7. The method of claim 6 further including the step of determining an initial GPS position and using the initial position to initially determine position related information.

8. The method of claim 7 wherein the step of initially determining includes determining variance covariance information relating to current and previous position error states.

9. The method of claim 8 wherein the step of initially determining further includes assuming a constant velocity and determining variance covariance information relating to current velocity error states.

10. A method of determining position using a Kalman filter, the method including the steps of:
    A. receiving signals from a plurality of GPS satellites;
    B. acquiring and tracking carriers and codes in the satellite signals;
    C. determining pseudoranges and Doppler rates based on the carrier and code measurements;
    D. measuring a parameter that over time measures position change;
    E. using the parameter to update position information relating to a current and a previous position and using the pseudoranges and Doppler rates to update and propagate current position related information;
    F. using the propagated current position related information to determine a position.

11. The method of claim 10 wherein, in the step of measuring a parameter, the parameter is carrier phase.

12. The method of claim 10 wherein, in the step of measuring a parameter, the parameter is wheel revolutions.

13. The method of claim 10 wherein, in the step of measuring a parameter, the parameter is barometric pressure.

* * * * *